Patented Nov. 13, 1945

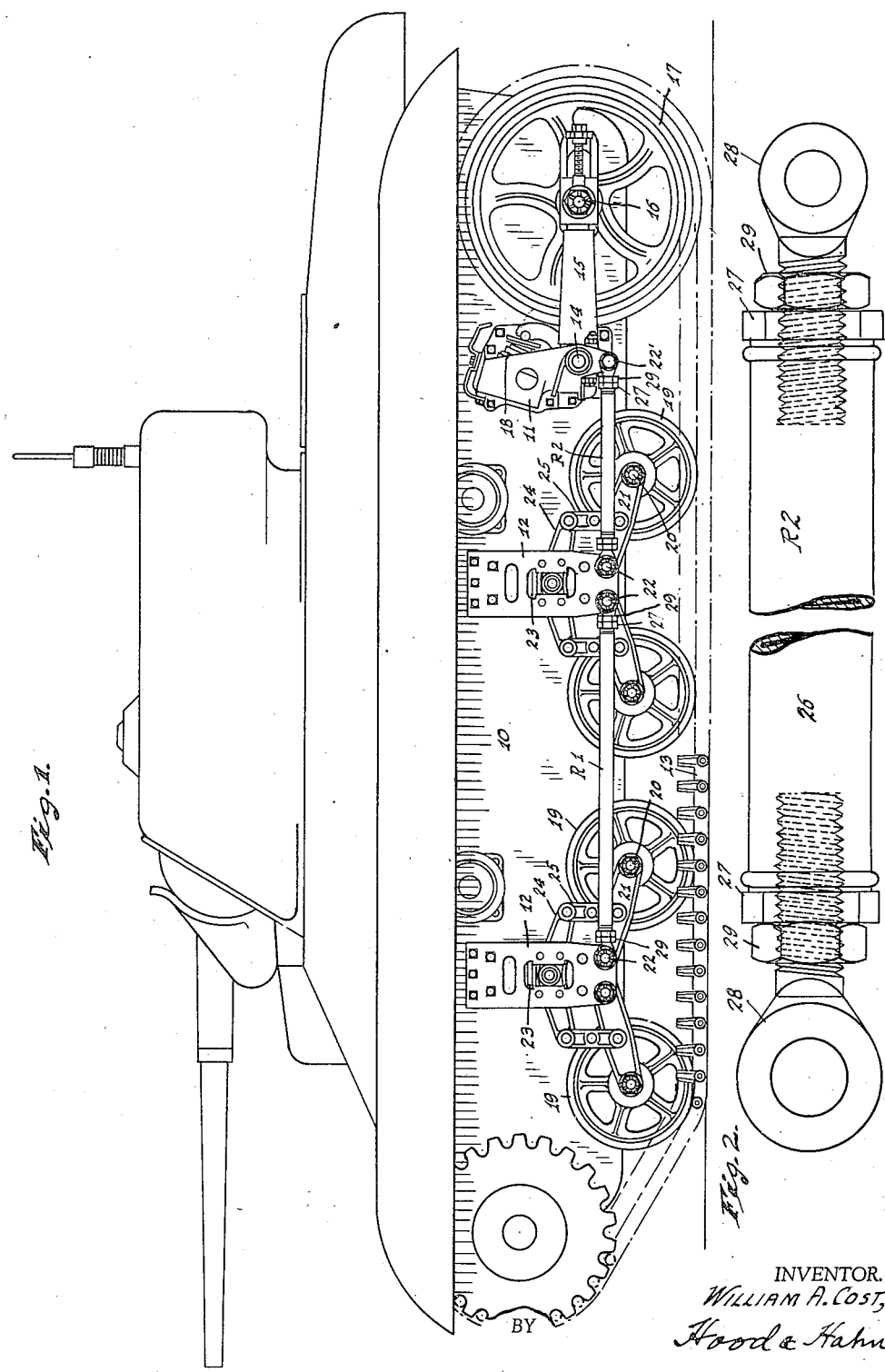

2,389,028

UNITED STATES PATENT OFFICE 2,389,028

ARMORED TANK CONSTRUCTION

William A. Cost, Indianapolis, Ind., assignor to Marmon-Herrington Company, Inc., Indianapolis, Ind., a corporation of Indiana Application October 8, 1943, Serial No. 505,455

1 Claim. (Cl. 305—9)

In vehicles of the endless track type, the endless track is engaged, in one bight, by an idler wheel generally supported by a bracket bolted to the side of the hull or main body of the vehicle. The endless track is also engaged by the bogey wheels which are mounted brackets bolted to the side of the hull or main body of the vehicle, said brackets being spaced from each other lengthwise of the vehicle.

Travel of such a vehicle along a rugged terrain subjects the idler and bogey wheels to enormous stresses tending to distort the supporting brackets thereby throwing the axes of the bogey wheels and idler out of parallelism essential to proper cooperation of those wheels with the track and consequently seriously interfering with proper steering and transport of the vehicle.

In light armored combat tanks total weight must be kept as low as possible to facilitate maneuverability, and weight limitations preclude securing desirable rigidity of mountings for bogey wheels and idler by means of heavy supporting brackets and hull side walls.

The object of my invention is to provide means in a vehicle of the endless track type, to brace the wheel-support in such manner that each bracket and adjacent hull portion may contribute to the stability of the other bracket by means which may be utilized to adjust the bogey wheels and idler relative to the normal track-plane, thereby reducing total weight without sacrifice of essential stability.

The accompanying drawing illustrates my invention.

Fig. 1 is a side elevation of an embodiment of my invention; and

Fig. 2 is a fragmentary section of one of the bracing elements.

In the drawing 10 indicates a side wall of the main body of the vehicle to which are bolted the idler wheel bracket 11 and the bogey wheel brackets 12, 12. These brackets project laterally from the wall 10 an amount approximating the width of the endless track 13.

Bracket 11 carries a pin 14 upon which is pivoted the bell-crank lever 15, the rearwardly projecting, and longer, arm of which is forked and carries an adjustable pin 16 upon which is journalled the track-engaging idler 17. The short arm of lever 15 is engaged by a spring 18 abutting bracket 11 so as to permit vertical yield of idler 17.

Each bogey wheel 19 is journalled on an axle 20 carried at the outer end of an arm 21 pivoted on a pin 22 carried by one of the two brackets 12, 12. Each arm 21 is urged downwardly by a spring 23 acting on a bell crank lever 24 connected by a link 25 to said arm.

The two adjacent pins 22, 22 of brackets 12, 12 are connected at their outer ends by the adjustable-length rod R1 and the rear pin 22 of the rear bracket 12 is connected at its outer end to the outer end of bracket 11, at pin 22', by a similar rod R2.

Each of rods R1 and R2 comprises a main length of tubing 26 provided at its opposite ends with oppositely-threaded nuts 27, 27 each receiving an appropriately-threaded shank of an eye 28 sized to fit over a pin 22 or a pin 22'. Associated with each nut and companion threaded shank is a jam nut 29.

Pins 22 and the trunnions for the idler and bogey wheels are parallel so as to insure proper tracking. Normal operation of the tank subjects the idler to enormous lateral stresses tending to disalign the idler from the track plane. Rods R2 and R1 transfer part of these stresses from bracket 11, and the adjacent parts of the side wall, to brackets 12, 12 and their adjacent side wall regions. Lateral stresses on the bogey wheels tend to warp the side wall adjacent brackets 12, 12 but part of these stresses are distributed by rods R1 and R2, consequently the total weight of brackets and side wall may be less than would be requisite in the absence of those rods.

It will also be noted that, in case one or the other of brackets 11, 12 be distorted, its wheel-supporting pins may be brought back into parallelism by rotation of tubes 26 of rods R1 and R2, and that this adjustment may be made by merely using an appropriate wrench.

Combat action often results in such disalignment of idler or bogey wheels as to seriously hamper proper steering of the vehicle even though no serious breakage has resulted. Under such conditions the construction which I have described permits quick adjustment of rods R1 and R2 so that operative conditions may be reestablished.

It will be understood that adjustability of the tie rods R1 and R2 permits initial accurate grouping of the brackets 11, 12, 12.

I claim as my invention:

In a vehicle of the endless-track type, comprising a main-body having a laterally distortable side wall, a plurality of laterally-projecting brackets secured to said wall at longitudinally-spaced points thereon, track-engaging wheels carried by said brackets, an endless track-belt encompassing said wheels, and an adjustable-length brace-rod connecting the outer ends of a pair of said brackets, whereby disturbance of parallelism of the axes of the track-laying wheels due to buckling of the side wall may be restored by length adjustment of the brace rod.

WILLIAM A. COST.